United States Patent
Reischer et al.

(10) Patent No.: US 11,275,626 B2
(45) Date of Patent: *Mar. 15, 2022

(54) SYSTEMS AND METHODS FOR IDENTIFYING RELATIONSHIPS IN SOCIAL MEDIA CONTENT

(71) Applicant: Social Sentinel, Inc., Burlington, VT (US)

(72) Inventors: Andrew J. Reischer, Ridgefield, CT (US); Natasha Conahan, San Diego, CA (US); John Orrange, Kansas City, MO (US); Scott Brightwell, Burlington, VT (US)

(73) Assignee: Social Sentinel, Inc., Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/247,171

(22) Filed: Dec. 2, 2020

(65) Prior Publication Data

US 2021/0089367 A1 Mar. 25, 2021

Related U.S. Application Data

(63) Continuation of application No. 15/773,473, filed as application No. PCT/US2015/062432 on Nov. 24, 2015, now Pat. No. 10,860,389.

(51) Int. Cl.
*G06F 9/54* (2006.01)
*G06F 16/28* (2019.01)
(Continued)

(52) U.S. Cl.
CPC ............ *G06F 9/54* (2013.01); *G06F 11/00* (2013.01); *G06F 16/288* (2019.01); *G06F 16/9535* (2019.01); *G06F 16/9537* (2019.01); *G06F 21/00* (2013.01); *G06F 21/552* (2013.01); *G06Q 50/265* (2013.01); *H04L 51/32* (2013.01); *G06Q 50/01* (2013.01)

(58) Field of Classification Search
CPC .......................... G06F 9/546; H04L 29/08072
USPC .......................... 719/313; 709/217, 218, 219
See application file for complete search history.

(56) References Cited

U.S. PATENT DOCUMENTS 9,762,462 B2* 9/2017 Cherifi ................... H04L 67/22
10,438,207 B2* 10/2019 Subhedar ............ H04L 63/1408

* cited by examiner

*Primary Examiner* — Andy Ho
(74) *Attorney, Agent, or Firm* — Downs Rachlin Martin PLLC

(57) ABSTRACT

The existence of a relationship between an author of content available on a social network application and an enterprise is determined from social network content to mitigate enterprise safety and security concerns. Content available on a social network application is monitored. The existence of a relationship is determined from the content available on the social network application. A description of the relationship between an author and the enterprise that was determined is stored. When content available on the social network application meets a threat criteria, a database may be queried for a relationship between the enterprise and the author of the content that meets the threat criteria. If the relationship is found, the content meeting the threat criteria and the description of the relationship may be reported to the enterprise. Alternatively, when content available on the social network application meets the threat criteria, a process of identifying a relationship may be initiated.

18 Claims, 4 Drawing Sheets

(51) Int. Cl.
*G06F 16/9535* (2019.01)
*G06F 16/9537* (2019.01)
*G06F 11/00* (2006.01)
*G06F 21/00* (2013.01)
*G06F 21/55* (2013.01)
*G06Q 50/26* (2012.01)
*H04L 51/52* (2022.01)
*G06Q 50/00* (2012.01)

SYSTEMS AND METHODS FOR IDENTIFYING RELATIONSHIPS IN SOCIAL MEDIA CONTENT

BACKGROUND

Historically and today, there have been large and small security risks. For example, in April 1999, two students launched an elaborate attack on their fellow students at Columbine High School in Colorado. In September 2013, unidentified gunmen attacked the upmarket Westgate shopping mall in Nairobi, Kenya. Students have been known to report bomb threats to avoid a test. Many suggest that the Internet has increased overall security risks, for example, by providing a means for terrorists to recruit others to their cause and to coordinate efforts anonymously.

In the meantime, social network applications have become popular for sharing content—such as image content, audio content, textual content, and location content—through the Internet. Users of social network applications generally choose to give up some of their privacy in favor of greater ease in creating and maintaining social contacts. A user of a social network application can create and share content via the social network application using, for example, posts, messages, comments, blogs, and mobile device settings. As a result of the popularity of social network applications, there is now a lot of information publicly-available that was not previously available. Moreover, the type of information available on social network applications was also generally not publicly-available before social network applications became popular.

SUMMARY OF THE INVENTION

The inventors of the present application recognized that the information available on social network applications today represents an opportunity. The inventors of the present application recognized that the information available via social network applications may be used to increase security today. In particular, a user of a social network application may share content that suggests a threat or a safety and security concern to a person or an organization. The inventors of the present application recognized that, while such content alone may be of interest, when combined with a relationship that may be determined from other content available via social network application, the content may be used to address the threat or concern.

Embodiments of the present invention provide a method, system, and computer readable medium to identify relationships between the author of content on a social network application and an enterprise. Sometimes the relationship can be identified from the content itself because it mentions the name of the enterprise. However, typically the content is more vague and the text of the content is not enough to determine a relationship. Under those circumstances, other information and past behavior of the author is relied on to determine a relationship with an enterprise. Embodiments of the present invention provide for identification of relationships between an author and an enterprise so that social media content of interest can be delivered to that enterprise, and safety and security concerns can be mitigated by the enterprise.

Content on social network applications is monitored including social media streams, blogs, chat groups, and forums for content (posts, comments, blogs). An existence of a relationship is determined between the authored of the content available in the social network application and an enterprise. The content is analyzed to identify if it meets a threat criteria. When the content meets the threat criteria, a database is queried to determine whether a relationship exists between the author of the content and the enterprise. If the relationship is found, the content available on the social network application that meets the threat criteria is reported to the enterprise. If the relationship is found, the description of the relationship between the enterprise and the author of the content available on the social network application that meets the threat criteria may also be reported to the enterprise.

BRIEF DESCRIPTION OF DRAWINGS

Some embodiments are illustrated by way of example in the accompanying drawings and should not be considered as a limitation of the invention.

DESCRIPTION OF EXEMPLARY EMBODIMENTS

Described in detail herein are systems and methods for identifying relationships from social network content to mitigate enterprise safety and security concerns. Embodiments of the present invention provide a method, system, and computer readable medium to identify relationships between a user on a social network application and an enterprise. The existence of a relationship can be determined from location information associated with the content, the use of an enterprise's name or a person's name associated with the enterprise, or the user's connection with a person associated with the enterprise. The existence of a relationship between a user and an enterprise is stored in a database. When the content satisfies a threat criteria, the database is queried to determine whether a relationship exists between the user (author) of the content and an enterprise. Embodiments of the present invention provide for identification of relationships between an author and an enterprise so that social media content of interest can be delivered to that enterprise, and safety and security concerns can be mitigated by the enterprise.

The following description is presented to enable any person skilled in the art to create and use a computer system configuration and related method and article of manufacture to identify relationships from social network content. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

As used herein, "enterprise" can refer to an organization, an entity, a business, an operation, an establishment, and the like.

As used herein, "social network application" can refer to a social networking service, a social networking platform, a social networking website, a social media application, a social media service, a social media platform, a social media website, and the like.

As used herein, "content" can refer to any user-generated content on a social network application or any content made available on a social network application via text, audio, or video mediums. A social network application may refer to content as posts, blogs, comments, status updates, notifications, check-ins, Tweets™, likes, reviews, and the like.

Figure 1:
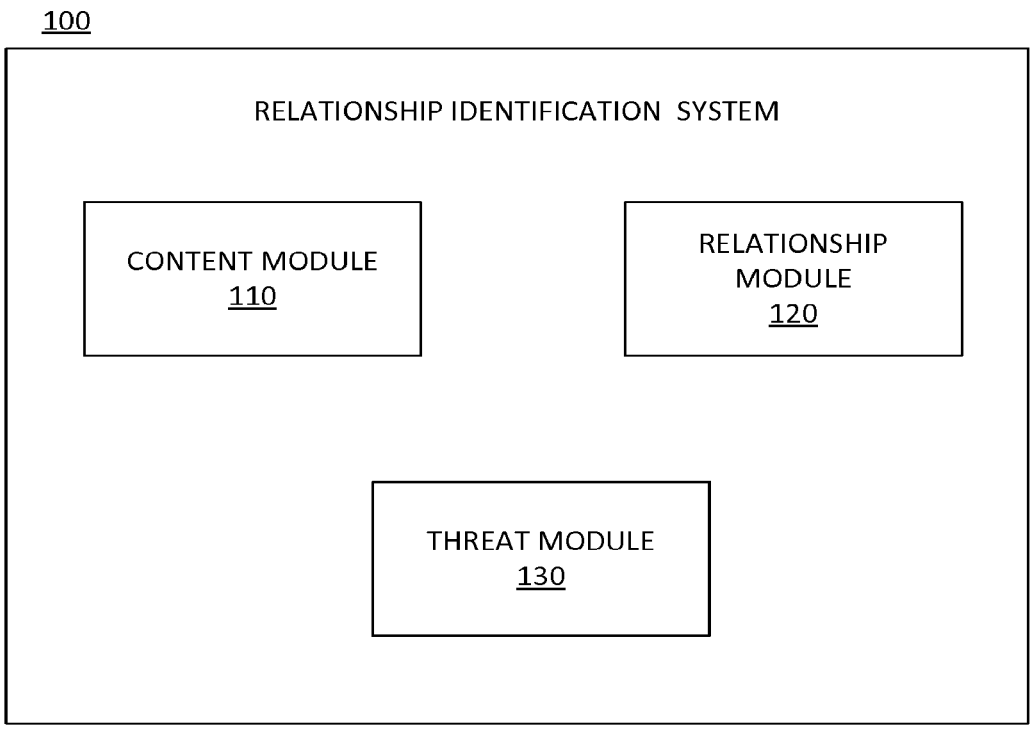
FIG. 1 is a block diagram showing a relationship identification system implemented in modules, according to an example embodiment.

FIG. 1 is a block diagram showing example modules 110, 120, 130 that can be included in a relationship identification system 100, according to an example embodiment. The modules may be implemented using a device and/or a system, such as, but not limited to, device 310 or server 320 described below in relation to FIG. 3. The modules may include various circuits, circuitry and one or more software components, programs, applications, apps or other units of code base or instructions configured to be executed by one or more processors included in device 310 or server 320. In other embodiments, one or more of modules 110, 120, 130 may be included in server 320, while others of the modules 110, 120, 130 can be provided in device 310. Although modules 110, 120, 130 are shown as distinct modules in FIG. 1, it should be understood that the procedures and/or computations performed using modules 110, 120, 130 may be implemented using fewer or more modules than illustrated. It should be understood that any of modules 110, 120, 130 may communicate with one or more components included in system 300, such as but not limited to database(s) 330, server 320, or device 310. In the example of FIG. 1, the relationship identification system 100 includes a content module 110, a relationship module 120, and a threat module 130.

The content module 110 may be a hardware-implemented module that may be configured to search, review, and monitor content available on social network applications, and retrieve content of interest in some embodiments. The relationship module 120 may be a hardware-implemented module that may be configured to determine an existence of a relationship between a social network application user and an enterprise from the content available on social network applications, and store the existence of a relationship in a database. The threat module 130 may be a hardware-implemented module that may be configured to identify whether content available on the social network application meets a criteria, and check the database for the existence of a relationship between the user associated with the content and an enterprise.

Figure 2:
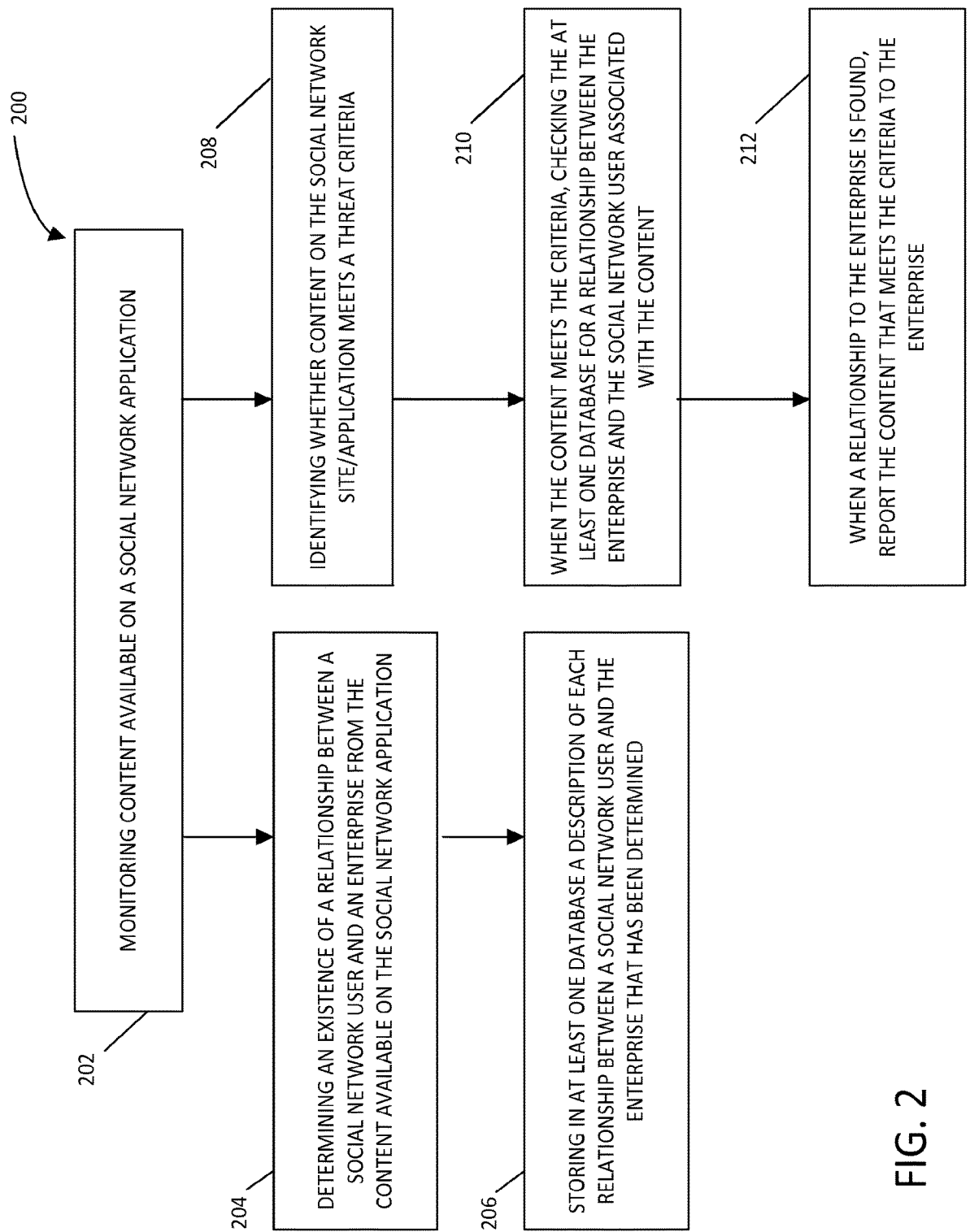
FIG. 2 is a flowchart showing an example method for identifying relationships from social network content to mitigate enterprise safety and security concerns, according to an example embodiment.

FIG. 2 is a flowchart showing an example method 200 for identifying relationships from social network content to mitigate enterprise safety and security concerns, according to an example embodiment. The method 200 may be performed using the example relationship identification system 100 shown in FIG. 1.

In step 202, the content module 110 monitors content available on a social network application. In step 202, embodiments of content module 110 do not filter the available content based on meeting a threat criteria. In some embodiments, the content module 110 can monitor content on multiple social network applications, such as Facebook, Flickr, Google+, Instagram, Meetup, Tumblr, Twitter, Vimeo, YouTube, WordPress, 4chan, Whisper, forums, and comments. The content module 110 may monitor publicly available content on social network applications. The monitoring of step 202 may be continuous or periodic.

In step 204, the relationship module 120 determines an existence of a relationship between a social network application user and an enterprise from the content available on the social network application. The existence of the relationship is determined from either location information associated with the content, use of a name of an enterprise by the social network application user, use of a name of a person by the social network application user where the person is associated with an enterprise, or the social network application user's connection with a person associated with an enterprise. The relationship module 120 may process content from the content module 110 to determine the existence of relationships continuously or in batches.

In some embodiments, the existence of a relationship is determined from the location information when the content indicates a geographic location of the social network application user as being near or at the enterprise while generating the content or making the content available to the social network application. Some social network applications allow a user to attach a location to the content based on where the user (or user's device) is physically located when the content is made available on the social network application. Some social network applications automatically attach location information to the content based on where the user (or user's device) is physically located when the content is made available on the social network application. Such information that identifies the physical location of the user when he or she made content available to the social network application is referred to here as location information. When the location information indicates that the user was in proximity of an enterprise, the relationship module 120 determines an existence of a relationship between the user and the enterprise based on the user's proximity to the enterprise when the user made content available in the social network application. Determining the user's proximity to an enterprise may be a configurable element in that a radius in miles may be provided that when the user is within that radius, the user is considered in proximity to the enterprise.

Some social network applications allow a user to "check-in" at a location or enterprise. A user may or may not make additional content available while they are checked-in at a location or enterprise. Such check-in information is also referred to here as location information, and the relationship module 120 can determine an existence of a relationship between the user and the enterprise based on the user checking-in at the enterprise or the location of an enterprise.

In some embodiments, the existence of a relationship is determined from the location information when a user profile of the social network application user is associated with the content indicates a geographic location that is the location of the enterprise or a location near the enterprise. Some social network applications allow a user to maintain a user profile that contains information related to the user, such as demographic information, home address, work address, and the like. In some embodiments, the user profile may include information indicating that he or she lives or works near an enterprise. Such information is also referred to here as location information. The relationship module 120 can determine an existence of a relationship between the user and the enterprise based on the user's profile including location information.

In an example embodiment, the user may include the name of a location or an enterprise in the content that he or she makes available via the social network application. The relationship module 120 determines an existence of a relationship between the user and the enterprise mentioned in the content. In some embodiments, the user may include the name of a person associated with an enterprise in the content that he or she makes available via the social network application. The relationship module 120 determines an existence of a relationship between the user and the enterprise based on the content mentioning a person associated with the enterprise. A person associated with an enterprise, for example, may be an employee of the enterprise, a student of the enterprise, a client of the enterprise, or a fan of the enterprise. Similarly, a person associated with an enterprise, for example, may be a relative of a person associated with the enterprise or a person at or near the enterprise. In some embodiments, a list of persons who are associated with an enterprise may be provided in a database, and the relationship module 120 may query the database to determine whether the content mentions any of the persons on the list.

The relationship module 120 can also determine an existence of a relationship between the user and an enterprise based on the user's social network connection with a person associated with the enterprise. Some social network applications allow a user to "connect" with other users of the social network application. For example, the user associated with the content available on the social network application may have a social network connection in the social network application with a person associated with the enterprise. A person associated with an enterprise, for example, may be an employee of the enterprise. The relationship module 120 can use this information to determine an existence of a relationship between the user and the enterprise.

In an example embodiment, at step 202, the content module 110 monitors recently made-available content in the social network application, and at step 204, the relationship module 120 determines relationships from recently made-available content. In other embodiments, the content module 110 monitors old content or content made-available in the past in the social network application, and the relationship module 120 determines an existence of a relationship from prior interactions of the user with the social network application. For example, the content generated by the user in the past may include location information as described above. As another example, the user may have checked-in at an enterprise in the past, or the user may have mentioned the enterprise or a person associated with the enterprise in content made available by the user in the past.

In step 206, the relationship module 120 stores in at least one database the existence of each relationship between an author and the enterprise that has been determined. The relationship module 120 may determine an existence of a relationship between multiple social network application users (authors) and an enterprise. The relationship module 120 stores the information relating an author to an enterprise based on content or profile information made available by the author on social network applications as described above with relation to operation 204.

In step 208, which may be carried out concurrently with step 204 or at nearly the same time as step 204, the threat module 130 identifies whether content available on the social network application meets a threat criteria. The threat module 130 may process content from the content module 110 to determine whether it meets a threat criteria continuously or in batches. The criteria may be a safety and security criteria that when met indicates the content includes a threat or relates to a safety and security concern. Any indication of the potential for harm, self-harm, and/or criminal activity that can endanger a person, a group of people, and/or property may satisfy a threat criteria. For example, the criteria may include the content using specific words or demonstrating certain intentions or emotions. A social network content reflecting behavior associated with self-harm, such as an expression of hopelessness, would meet a suicide threat criteria. A social network content reflecting templatized behaviors indicative or associated with mimetic (copycat) acts of violence, such as a well-known assault, would meet a harm threat criteria.

In step 210, when the content meets the criteria, the threat module 130 queries the database for the existence of a relationship between the author of the content meeting the criteria and an enterprise as determined in step 204.

In some embodiments, the method 200 further includes monitoring multiple social network applications and identifying a connection between an author on a first social network application and an author on a second social network application. An author on the first social network application may generate or make content available associated with an author on the second social network application in such a manner that it can be determined that the author on the first social network application and the author on the second social network application is the same. For example, the author may share content previously made available on the second social network application in the first social network application. As a non-limiting example, an author may share a Tweet™ from Twitter® in his or her account in Facebook®. The connection determined here may be stored in a database.

As described above, in an example embodiment, the existence of a relationship between an enterprise and an author of content made available on a social network application is determined and a description of the relationship is stored in a database. Then content meeting a threat criteria is identified, and the database is queried to determine if a relationship exists between the author of the content meeting the criteria and an enterprise.

In another example embodiment, content available on a social network application is monitored and content meeting a threat criteria is first identified. Then it is determined whether a relationship exists between an enterprise and the author of the content identified as meeting the criteria. The existence of a relationship can be determined by querying the database that may have stored a description of a relationship between an author and an enterprise. If the database does not indicate or support an existence of a relationship between the author and an enterprise, then existence of a relationship may be determined from the content identified as meeting the criteria (using various methods described in relation to step 204), or from past content made available by the author on the social network application (using various methods described in relation to step 204).

In some embodiments, in step 212, once an existence of a relationship is determined between an author of content that meets the criteria and an enterprise, the content meeting the criteria is provided to the enterprise. In step 212, when a relationship to the enterprise is found, the description of the relationship between the enterprise and the author of the content that meets the criteria may also be provided to the enterprise. With the information from step 212, the enterprise may take appropriate actions to prevent or avoid harm to the enterprise or persons associated with the enterprise.

As a non-limiting example, the following content is monitored and considered: "Don't go to school tomorrow, I'm going to blow it up." The relationship identification system described here determines an existence of a relationship between the enterprise, Ridgefield High School, and the author of the content based on the content available on a social network application. This relationship is stored in a database, and Ridgefield High School may be provided the content and the name or username of the author of the content.

As another non-limiting example, the following content is monitored and considered: "I hate working at the hospital." The relationship identification system described here determines an existence of a relationship between the enterprise, Springfield General Hospital, and the author of the content based on the content in a social networking application mentioning the name of the enterprise. A description of this relationship is stored in a database, however, the content is likely not provided to Springfield General Hospital because the content does not meet a threat criteria.

As another non-limiting example, the following content is monitored and considered: "I'm going to kill John Smith." John Smith may be on a list of persons associated with an enterprise, for example, Springfield General Hospital. The relationship identification system described here determines an existence of a relationship between the enterprise, Springfield General Hospital and the author of the content based on the content mentioning the name of a person associated with an enterprise. A description of this relationship is stored in a database, and Springfield General Hospital would be provided the content and the description of the relationship of the content to Sprinfield General Hospital.

As another non-limiting example, the following content is monitored and considered: "I love John Smith." John Smith may be on a list of persons associated with an enterprise, for example, State University. The relationship identification system described here determines an existence of a relationship between the enterprise, State University, and the author of the content based on the content mentioning the name of a person associated with an enterprise. A description of this relationship is stored in a database, however, the content may not be provided to State University because the content does not meet a threat criteria.

As another non-limiting example, the following content is monitored and considered: "I am taking a gun to school tomorrow." According to the user profile of the author of the content, he goes to school at Community College. The relationship identification system described here determines an existence of a relationship between the enterprise, Community College, and the author of the content based on his user profile indicating that he frequents the enterprise because he attends school there. A description of this relationship is stored in a database, and Community College will be provided the content and the relationship if the content meets a threat criteria.

As another non-limiting example, the following content is monitored and considered: "I hate this place." This content has location information associated with it because the author made it available at a particular geographic location that was stored by the social network application. The geographic location is that of the Best Hotel and Resort. The relationship identification system described here determines an existence of a relationship between the enterprise, Best Hotel and Resort, and the author of the content based on the location information associated with the content. A description of this relationship is stored in a database, however, the content may not be provided to Best Hotel and Resort because the content does not meet a threat criteria.

As another non-limiting example, the following content is monitored and considered: "I am going to kill my girlfriend." According to the author's social network connections, Jane Smith is the author's girlfriend. Jane Smith is on the list of persons associated with the enterprise, Townville Municipality. The relationship identification system described here determines an existence of a relationship between the enterprise, Townville Municipality, and the author of the content based on the author's social network connection with a person associated with the enterprise. A description of this relationship is stored in a database, and Townville Municipality may be provided the content and the description of its relationship to Townville Municipality.

To the extent that content that meets a threat criteria has been identified, but the database reports no relationship between the enterprise and the author of the content, a special process may be initiated to look for a possible relationship. For example, the author's content available on various social networking applications may be reviewed. Accordingly, step 204 may follow step 210.

In this manner, the systems and methods described herein provide a method, system, and computer readable medium to identify relationships between the author of content on a social network application and an enterprise. Sometimes the relationship can be identified from the content itself because it mentions the name of the enterprise. Other times information related to the content and past behavior of the author is relied on to determine a relationship with an enterprise. Once a relationship is identified, the enterprise can be notified of the content of concern and of the user of concern so that safety and security concerns may be mitigated.

Figure 3:
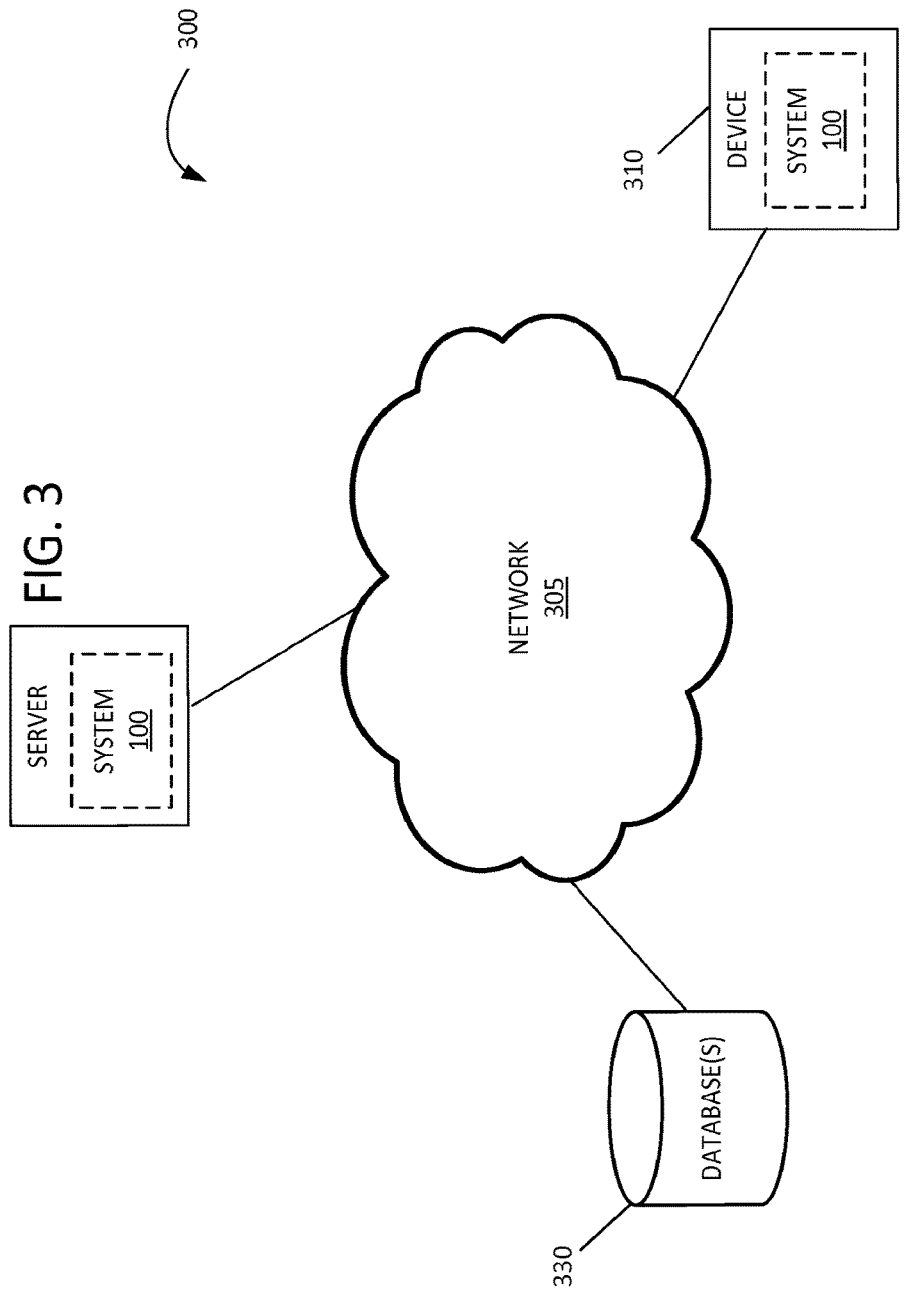
FIG. 3 illustrates a network diagram depicting a system for identifying relationships from social network content, according to an example embodiment.

FIG. 3 illustrates a network diagram depicting a system 300 for identifying relationships from social network content, according to an example embodiment, according to an example embodiment. The system 300 can include a network 305, a device 310, a server 320, and database(s) 330. Each of the device 310, server 320, and database(s) 330 is in communication with the network 305.

In an example embodiment, one or more portions of network 305 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 310 may comprise, but is not limited to, work stations, computers, general purpose computers, Internet appliances, hand-held devices, wireless devices, portable devices, wearable computers, cellular or mobile phones, portable digital assistants (PDAs), smartphones, tablets, ultrabooks, netbooks, laptops, desktops, multi-processor systems, microprocessor-based or programmable consumer electronics, network PCs, mini-computers, and the like. The device 310 may include one or more components described in relation to FIG. 4.

The device 310 may connect to network 305 via a wired or wireless connection. The device 310 may include one or more applications or systems such as, but not limited to, a social network application, a relationship identification system, and the like. In an example embodiment, the device 310 may perform all the functionalities described herein.

In other embodiments, the relationship identification system may be included on either device 310, and the server 320 performs the functionalities described herein. In yet another embodiment, the device 310 may perform some of the functionalities, and server 320 performs the other functionalities described herein. For example, device 310 may determine an existence of a relationship between a social network user and an enterprise and store the existence of the relationship in a database, while server 320 may monitor content available on a social network application.

The database(s) 330 may store data related to existence of a relationship between a user and an enterprise. Each of the server 320 and database(s) 330 is connected to the network 305 via a wired connection. Alternatively, one or more of the server 320 and database(s) 330 may be connected to the network 305 via a wireless connection. Server 320 comprises one or more computers or processors configured to communicate with device 310 and/or database(s) 330 via network 305. Server 320 hosts one or more applications or websites accessed by device 310 and/or facilitates access to the content of database(s) 330. Server 320 also may include system 100 described herein. Database(s) 330 comprise one or more storage devices for storing data and/or instructions (or code) for use by server 320 and/or device 310. Database(s) 330 and server 320 may be located at one or more geographically distributed locations from each other or from device 310. Alternatively, database(s) 330 may be included within server 320.

Figure 4:
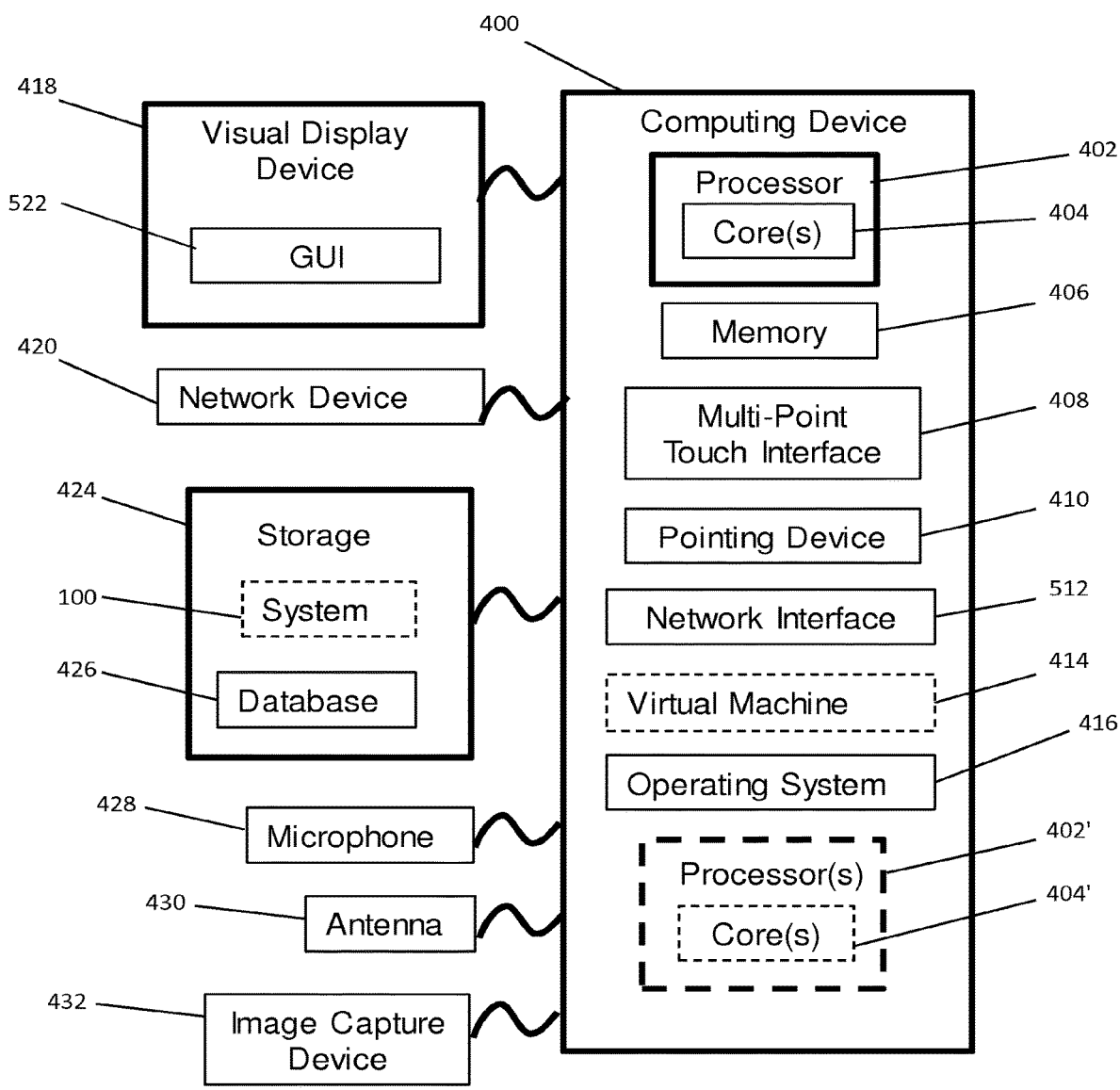
FIG. 4 is a block diagram of an example computing device that may be used to implement exemplary embodiments of the relationship identification system described herein.

FIG. 4 is a block diagram of an exemplary computing device 400 that may be used to implement exemplary embodiments of the relationship identification system 100 described herein. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software for implementing exemplary embodiments of the relationship identification system 100. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 418, such as a computer monitor, which may display one or more graphical user interfaces 422 that may be provided in accordance with exemplary embodiments. The computing device 400 may include other I/O devices for receiving input from a user, for example, a keyboard or any suitable multi-point touch interface 408, a pointing device 410 (e.g., a mouse), a microphone 428, and/or an image capturing device 432 (e.g., a camera or scanner). The multi-point touch interface 408 (e.g., keyboard, pin pad, scanner, touch-screen, etc.) and the pointing device 410 (e.g., mouse, stylus pen, etc.) may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the relationship identification system 100 described herein. Exemplary storage device 424 may also store one or more databases for storing any suitable information required to implement exemplary embodiments. For example, exemplary storage device 424 can store one or more databases 426 for storing information, such relationships between a user and an enterprise, and any other information to be used by embodiments of the system 100. The databases may be updated manually or automatically at any suitable time to add, delete, and/or update one or more data items in the databases.

The computing device 400 can include a network interface 412 configured to interface via one or more network devices 420 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 400 can include one or more antennas 430 to facilitate wireless communication (e.g., via the network interface) between the computing device 400 and a network. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method of identifying relationships from social network content to mitigate enterprise safety and security concerns comprising:
    monitoring content available on at least one social network application;
    determining an existence of relationships between authors of content available on the social network application and an enterprise from the content available on the social network application, wherein the existence of the relationships are determined from one of an author's use of a name of a person associated with the enterprise, and an author's connection with a person associated with the enterprise;
    identifying content available on the social network application that meets a threat criteria and that was authored by one of the authors that have a relationship to the enterprise; and
    reporting the content available on the social network application that meets the threat criteria and a description of the determined relationship between the author of the content that meets the threat criteria and the enterprise to the enterprise.

2. The method of claim 1, wherein the existence of a relationship is further determined from location information when the content indicates a geographic location of the author as being near or at the enterprise while generating the content.

3. The method of claim 1, wherein the existence of a relationship is further determined from location information when a profile of the author of the content indicates a geographic location.

4. The method of claim 1, wherein the existence of a relationship is determined from content that was created prior to the creation of the content that meets the threat criteria.

5. The method of claim 1, wherein the monitoring step includes monitoring content available on multiple social network applications, wherein the identifying content that meets a threat criteria and that was authored by one of the authors that have a relationship to the enterprise includes identifying content on other ones of the multiple social network applications than a social network application where an existence of a relationship was determined.

6. The method of claim 1, wherein identifying whether content from an author on the social network application meets a threat criteria includes identifying content reflecting behavior associated with self-harm that includes an expression of hopelessness that meets a suicide threat criteria.

7. A method of identifying relationships from social network content to mitigate enterprise safety and security concerns comprising:
    monitoring a plurality of content on at least one social network application for a threat to an enterprise;
    determining whether one of the monitored content on the social network application meets a threat criteria;
    in response to determining that one of the monitored content meets the threat criteria, determining an existence of a relationship between the one of the plurality of content and the enterprise, wherein the determining an existence of a relationship is performed by searching for a relationship in the monitored content after the step of identifying one of the plurality of content meets the threat criteria; and
    in response to determining the existence of a relationship, reporting both a description of the relationship and the content available on the social network application that meets the threat criteria to the enterprise.

8. The method of claim 7, wherein an existence of a relationship is determined by searching content that was created prior to the creation of the content that meets the threat criteria.

9. The method of claim 7, wherein the existence of the relationship is determined from one of location information, an authors use of a name of the enterprise, an author's use of a name of a person associated with the enterprise, and an author's connection with a person associated with the enterprise.

10. The method of claim 9, wherein the existence of a relationship is determined from the location information when the content indicates a geographic location of the author as being at or near the enterprise while generating the content.

11. The method of claim 9, wherein the existence of a relationship is determined from the location information when a profile of the author associated with the content indicates a geographic location.

12. The method of claim 7, wherein the monitoring step includes monitoring content available on multiple social network applications, wherein the determining an existence of a relationship includes searching content on other ones of the multiple social network applications than a social network application where content that met a threat criteria was identified.

13. The method of claim 7, wherein identifying whether content from an author on the social network application meets a threat criteria includes identifying content reflecting behavior associated with self-harm that includes an expression of hopelessness that meets a suicide threat criteria.

14. A method of identifying relationships from social network content to mitigate enterprise safety and security concerns comprising:
- monitoring content available on at least one social network application, wherein the monitoring includes searching the monitored content for content that has a relationship to an enterprise or that meets a threat criteria, wherein the relationship is determined from identifying an enterprise attribute in the monitored content;
- in response to identifying first content in the monitored content that has a relationship to an enterprise, determining whether any of the identified first content meets a threat criteria;
- in response to identifying second content in the monitored content that meets a threat criteria, determining whether any of the identified second content has a relationship to the enterprise by searching for a relationship in the monitored content after identifying the second content; and
- reporting ones of the first and second content that have a relationship to the enterprise and that contain a threat criteria.

15. The method of claim 14, wherein the enterprise attribute includes one or more of enterprise location(s), a name of an enterprise, or names of people, facilities, or buildings associated with the enterprise.

16. The method of claim 14, wherein the identifying an enterprise attribute in the content includes identifying location information indicating a geographic location of an author of content was at or proximate the enterprise when the content was generated.

17. The method of claim 14, wherein the determining whether any of the identified second content has a relationship to the enterprise includes searching content generated in the past by an author of the second content.

18. The method of claim 14, wherein the monitoring step includes monitoring content available on multiple social network applications, wherein the determining whether any of the identified second content has a relationship to the enterprise includes:
- identifying the second content from a first author on a first one of the social network applications; and
- searching content on other ones of the multiple social network applications for content generated by the first author to determine if the author has a relationship to the enterprise.

* * * * *